Feb. 9, 1937.    R. A. SANDBERG    2,070,413
HYDRAULIC SHOCK ABSORBER
Filed July 8, 1935.    4 Sheets-Sheet 1

Inventor
Ray A. Sandberg.
by Charles H. Hills Attys.

Feb. 9, 1937.   R. A. SANDBERG   2,070,413
HYDRAULIC SHOCK ABSORBER
Filed July 8, 1935   4 Sheets-Sheet 2

Inventor
Ray A. Sandberg.
by Charles H. Hill Attys.

Feb. 9, 1937.  R. A. SANDBERG  2,070,413
HYDRAULIC SHOCK ABSORBER
Filed July 8, 1935  4 Sheets-Sheet 3
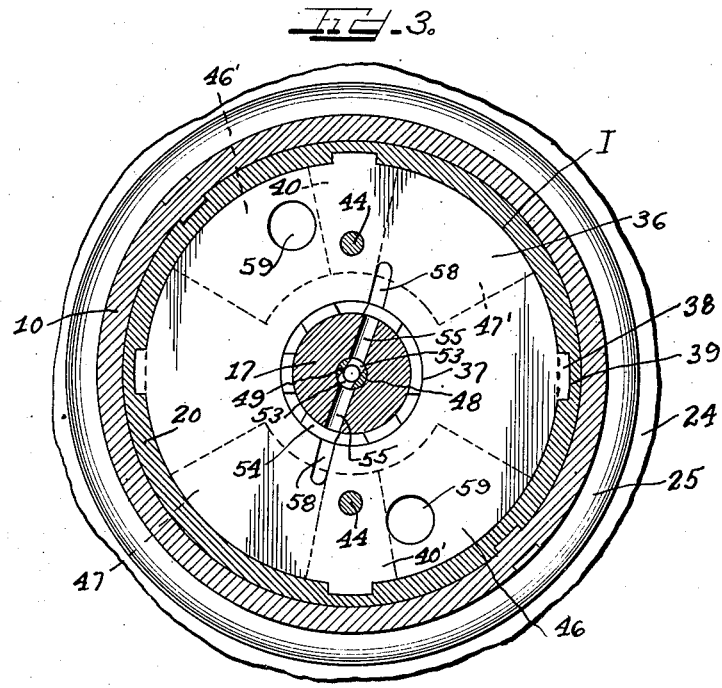
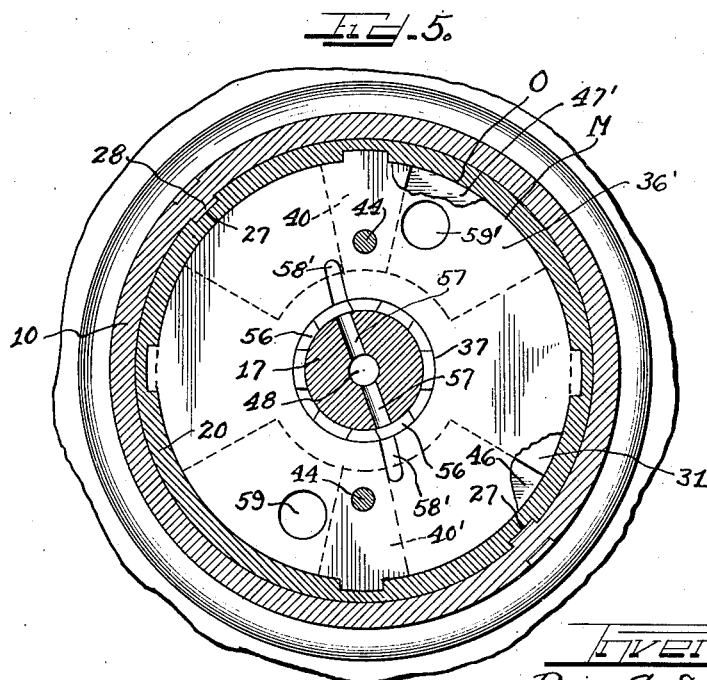
Inventor
Ray A. Sandberg.
by Charles O'Neill Attys.

Feb. 9, 1937. R. A. SANDBERG 2,070,413
HYDRAULIC SHOCK ABSORBER
Filed July 8, 1935 4 Sheets-Sheet 4
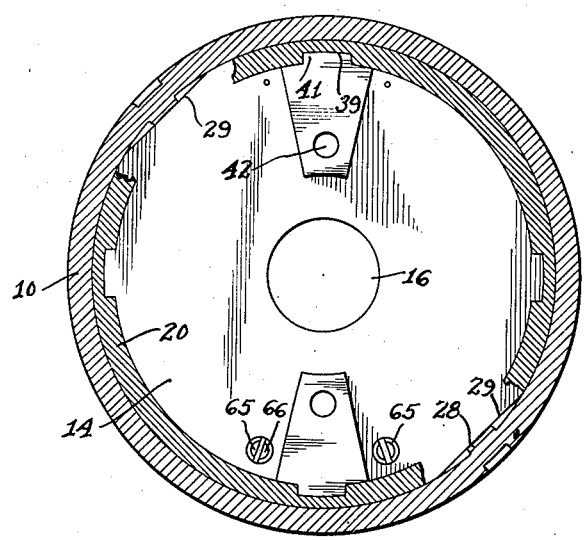
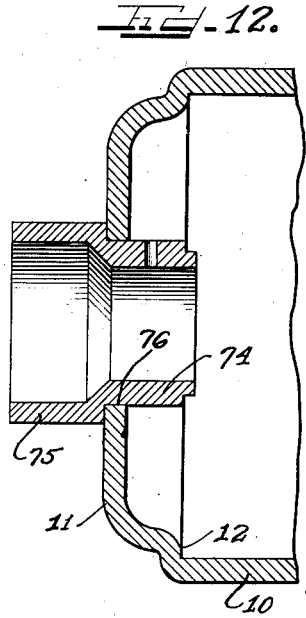
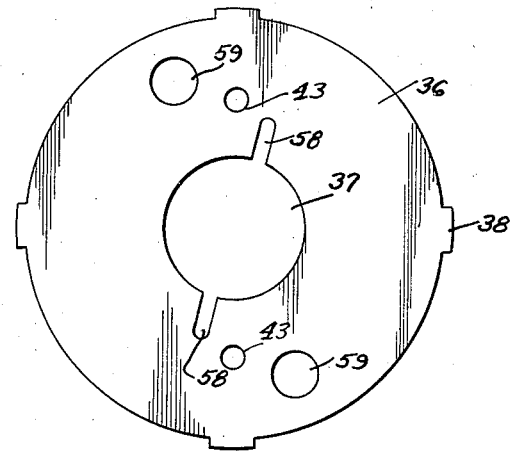
Inventor
Ray A. Sandberg.
by Charles H. Wills Attys Patented Feb. 9, 1937

2,070,413

UNITED STATES PATENT OFFICE 2,070,413

HYDRAULIC SHOCK ABSORBER

Ray A. Sandberg, Waukegan, Ill., assignor to Houde Engineering Corporation, Buffalo, N. Y., a corporation of New York Application July 8, 1935, Serial No. 30,317

16 Claims. (Cl. 188—89)

My invention relates to hydraulic shock absorbers of the rotary piston type and adapted particularly for use on automotive vehicles for checking and controlling the vehicle spring action.

The general object of the invention is to provide an improved, durable and efficient shock absorber in which the parts are, so far as possible, formed of metal stampings which can be economically produced and assembled, with special machining and finishing reduced to a minimum.

More in detail, an important object of the invention is to provide a shock absorber comprising a cylindrical housing sub-divided axially into a plurality of hydraulic chambers with a piston unit operable in each chamber and keyed to a common shaft journaled in the housing and with abutment members in the chambers dividing said chambers into high pressure and low pressure working compartments suitably interconnected for flow of displaced hydraulic fluid under control of suitable valve mechanism.

A further object is to produce the piston unit, comprising a hub with integral vanes extending radially therefrom, of laminations in the form of steel stampings welded or brazed together to build up the unit.

Another object is to provide partition members in the form of discs stamped from sheet steel for insertion into the housing to define the individual fluid spaces for the piston units, and to provide passages through the plates for connecting together the high and low pressure working spaces respectively and conducting the displaced fluid for passage through the controlling valve mechanism.

Still another object is to provide an arrangement in which separable end walls for the cylindrical housing and the separate abutment and partition members and the piston units may be readily inserted in proper sequence into the housing by suitable guide means which will then function to hold the assembled parts in proper cooperative relationship.

The above enumerated and other features of the invention are incorporated in the structure shown on the drawings, in which drawings—

Figure 3 is a section on plane III—III of Figure 1;

Figure 5 is a section on plane V—V of Figure 1;

Figure 6 is a section on plane VI—VI of Figure 1;

Figure 7 is a plan view of one of the partition discs;

Figures 8 and 9 show respectively the laminations to be welded together to form a piston unit;

Figure 10 shows the laminations assembled ready for welding;

Figure 11 shows the completed piston unit; and

Figure 12 is a vertical diametral section of the end of the shock absorber housing showing the modified bearing arrangement for the shaft.

Figure 1:
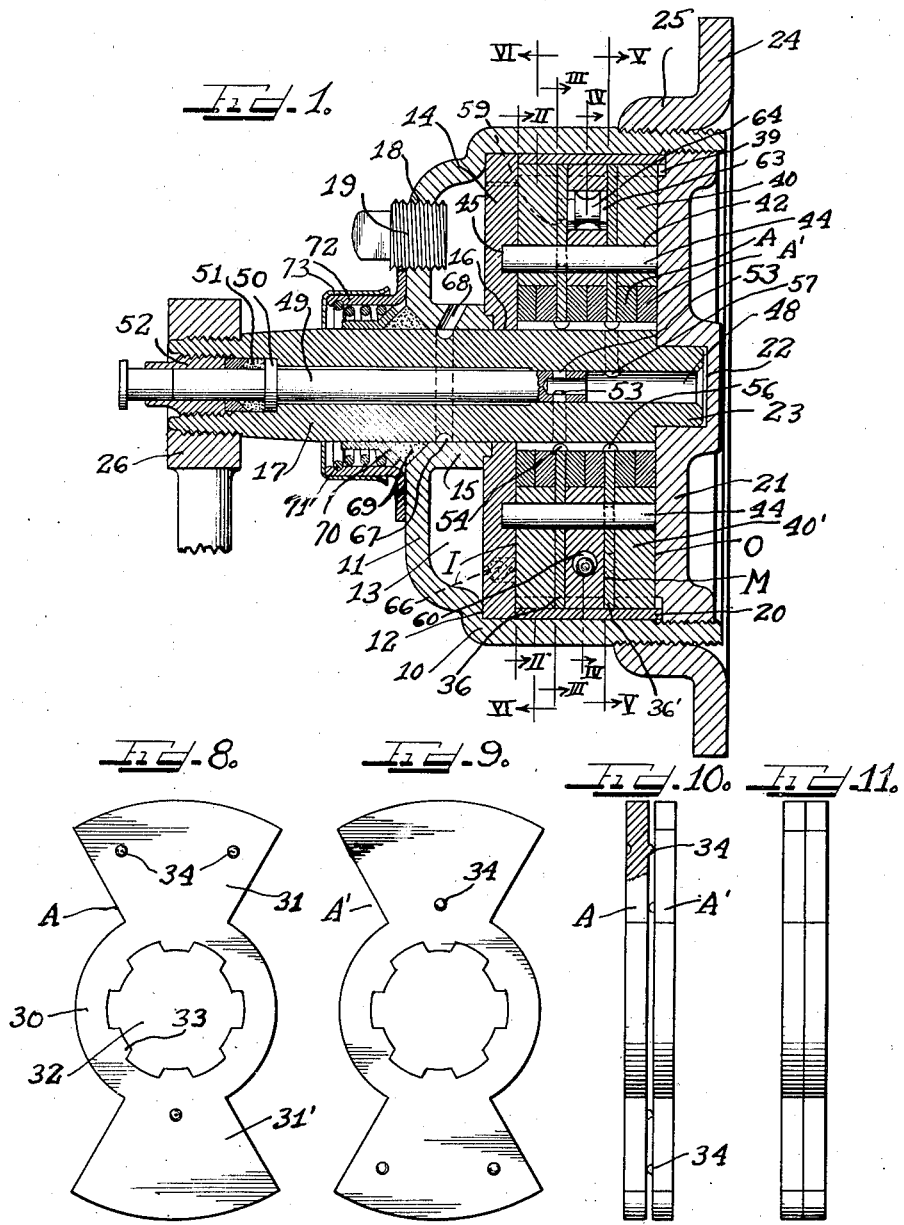
Figure 1 is a vertical diametral section of the shock absorber.

On the shock absorber shown the housing is in the form of a cylindrical cup which may be stamped integral from sheet metal and comprising the cylindrical wall 10 and the bottom 11 deflected axially and off-set radially to provide a seating shoulder 12 and the space 13. A cylindrical plate 14 fits into the wall 10 and seats on the shoulder 12. The bottom 11 is deflected inwardly at its central part to form the annular flange 15 whose inner edge forms an inner seat for the plate 14, the plate having the bore 16 aligning with the bore of the flange 15 to form a bearing support for the outer part of the piston shaft 17. The space 13 confined by the housing bottom part 11, the plate 14, and the bearing flange 15 forms a reservoir for hydraulic fluid which can be filled thereinto through a filler opening 18 normally closed by a plug 19.

A cylindrical ring 20 forms a bushing for the annular wall 10 of the housing and abuts against the plate 14, the annular wall 10 at its outer end having internal threading for receiving the cover 21 which abuts the outer edge of the ring 20, this cover, the plate 14 and the ring 20 defining a cylindrical space for the hydraulic fluid. The cover has the cylindrical bearing recess 22 for the reduced inner end 23 of the piston shaft.

The supporting base 24 for the shock absorber structure may be in the form of a stamping provided with the annular flange 25 for threaded engagement with the exterior of the housing wall 10 and by means of this supporting base the shock absorber structure may be secured in suitable manner to a support as, for example, the chassis of an automotive vehicle, a lever structure 26 secured to the outer end of the piston shaft being connected by suitable linkage, usually with the vehicle axle.

To hold the bushing ring 20 against rotational displacement, it is provided with longitudinally extending channels 27 in its outer face for receiving abutments 28 formed on the inner side of the housing wall 10 preferably by extrusion of the metal of the wall, and the plate 14 has channels 29 for clearing the abutments 28 so that the plate may be readily inserted into proper position, as shown on Fig. 6.

Referring particularly to Figures 8, 9, 10 and 11, each piston unit is shown as comprising two laminations A and A' which are preferably stamped integral from steel, each lamination comprising a cylindrical hub part 30 and diametrically opposite vane portions 31 and 31', the hub opening 32 having teeth 33 extending thereinto. The laminations for each piston unit are preferably brazed or welded together. Where they are to be welded together teats 34 are provided on the opposed faces of the laminations which teats can readily be formed by extrusion of the metal. In order that the laminations be all alike while at the same time providing a sufficient number of teats, an arrangement such as shown is provided where each lamination has a number of teats near the outer end of one of the vanes and one or more teats near the inner end of the opposite vane and then, before the laminations are assembled for welding they are displaced 180° so that there will be an equal number of teats equally spaced between opposed vanes. The assembled laminations are then placed between the terminals of an electric welding machine so that under flow of current through the teats they will be fused and the laminations will be thus rigidly and intimately secured together to form the piston unit. Instead of welding the laminations together electrically, hydrogen welding should be used, or they can be secured together by brazing. Figure 10 shows the assembly of the laminations before the welding operation and Figure 11 shows the completed piston unit.

Between the end wall or plate 14 and the outer or cover wall 21 the shaft 17 is of slightly increased diameter to fit the openings 32 of the piston units and the shaft at this part has the channels 35 for receiving the teeth 33 of the piston units so that these units may be keyed and secured to rotate with the shafts after they are applied thereto. When the piston units are aligned on the shaft the outer surfaces of their vanes engage the inner surface of the bushing ring 20.

As shown, there are three piston units, the inner unit engaging the inner end wall or plate 14 and the outer unit being engaged by the outer end wall or cover 21. Between the inner and outer units respectively and the intermediate piston unit partition walls 36 and 36' are inserted in the bushing ring 20, these partitions being alike and each in the form of a stamped disc preferably of steel, Figure 7 showing one of these partition discs. Each disc has the central opening 37 to fit the piston shaft and at its perimeter has abutment projections 38 for engaging in channels 39 formed in the bushing ring 20 so that after assembly of the partition discs in the bushing ring they will be held against rotational displacement. I have shown four lugs 38 on each disc spaced 90° apart.

The cylindrical space between the end walls 14 and 21 is divided by the partition discs into three individual hydraulic chambers I, M and O, in each of which one of the piston units is operable. In each of the chambers are provided diametrally opposed dam or abutment members 40 and 40' which extend between the bushing ring and the hub of the corresponding piston unit, each of the dam members having a key projection 41 for engaging in one of the channels 39 in the bushing ring so that the dam members are anchored at their outer ends to the ring, these channels 39 also receiving the lugs 38 on the partition discs. The dam members at each side of the piston unit are in alignment in axial direction relative to the piston shaft and have holes 42 therethrough in alignment with holes 43 in the partition discs, pins 44 extending through the aligned holes with their inner ends engaging in recesses 45 in the inner end wall or plate 14, this end wall and the dam members and the partition discs being thus held together against relative rotation and against rotation relative to the housing 10 as the bushing ring 20 to which the dam members are anchored by their key projections 41 is in turn held against rotary displacement in the housing 10 by the lugs 28. The piston units and the dam members in each of the individual hydraulic chambers divide the chambers into high pressure compartments 46—46' and low pressure compartments 47—47' between which high pressure and low pressure compartments there must be an interflow of hydraulic fluid as the piston units are oscillated during travel of the vehicle to which the shock absorber is applied.

The piston shaft 16 has the axial bore 48 into which extends the valve stem 49 from the outer end of the shaft. The outer end of the bore is of enlarged diameter to receive the abutment collar 50 on the valve stem together with packing material 51 and a gland plug 52. At its inner end the stem is hollow to provide a valve structure which has the diametrally opposite ports 53 extending radially. In radial alignment with these ports the shaft has the circumferential channel 54 from which passages 55—55 extend radially through the shaft to the shaft bore 48 as shown in Figure 3. Outwardly of the channel 54 the shaft has a second circumferential channel 56 from which passages 57—57 extend radially through the shaft to the shaft bore, as clearly shown in Figure 5.

Figure 2:
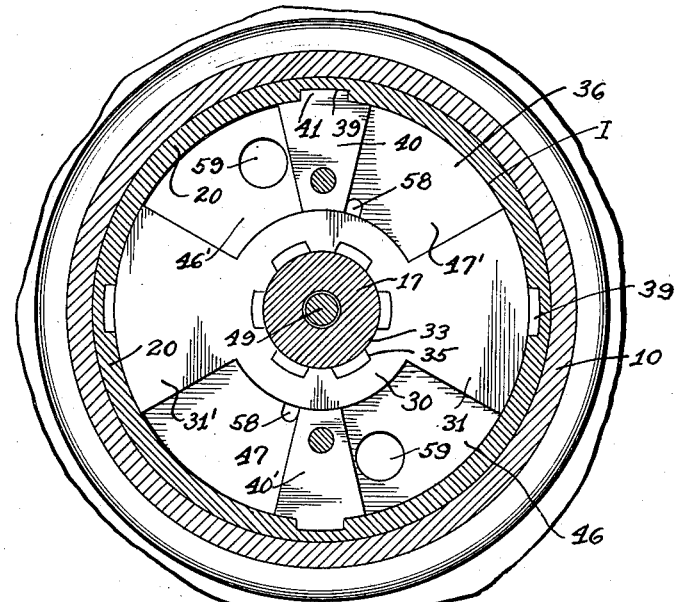
Figure 2 is a section on plane II—II of Figure 1.

Referring particularly to Figure 3, the partition disc 36 which is in alignment with the shaft passages 55—55 and the fluid collecting channel 54, has slots 58—58 extending a distance outwardly from the disc center opening 37 and terminate a distance beyond the hub line of the piston unit to communicate at their outer ends with the low pressure compartments 47—47' at one side of the dam lugs 40—40' in the inner fluid chamber as clearly shown in Figures 2 and 3. The partition disc has also holes or passages 59—59 therethrough which openings effect communication between the high pressure working compartments 46 and 46' respectively of the inner and intermediate fluid chambers I and M between which the disc is located.

Figure 4:
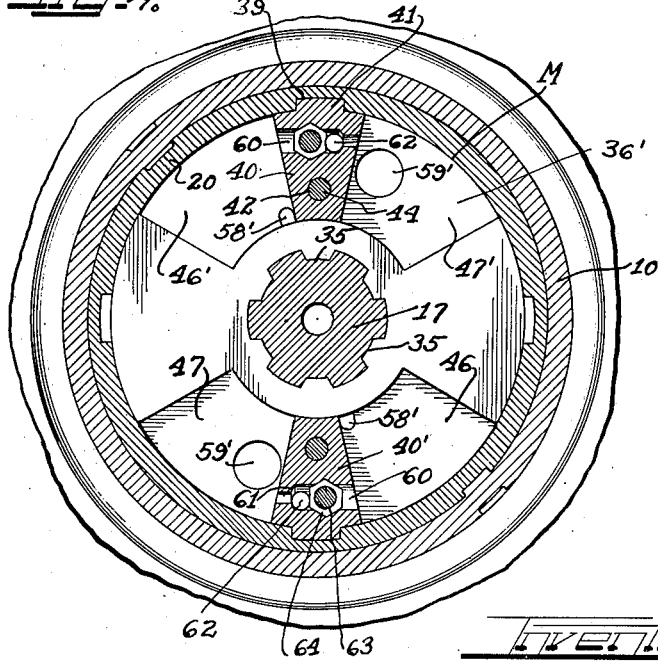
Figure 4 is a section on plane IV—IV of Figure 1.

Referring now to Figures 4 and 5, the partition disc 36', which is a duplicate of partition disc 36, is inserted in inverted position relative to the disc 36 so that the slots 58'—58' of the disc 36' will be so located as to connect the high pressure working compartments respectively of the intermediate and outer fluid chambers M and O with the fluid collecting channel 56 in the shaft which channel is connected by the passages 57—57 with the shaft bore, while the passages 59'—59' through the disc 36" will establish communication between the low pressure compartments 47 and 47' respectively of the intermediate and outer fluid chambers M and O.

Describing the operation of the structure thus far referred to, when the piston structure is rotated by the shaft in clockwise direction, the fluid is displaced from the high pressure compartments 46 and 46' of the intermediate and outer chambers M and O through the slots 58' of the disc 36' and through the collecting channel 56 in the shaft and from there through the shaft passages 57 to the shaft bore, and from the bore through the valve ports 53 and shaft passages 55 to the collecting channel 54 from where the fluid flows through the slots 58 of disc 36 into the low pressure working compartments 47 and 47' of the inner and intermediate chambers I and M in the wake of the traveling piston structure. In the inner chamber I the fluid displaced from the high pressure compartments 46 and 46' finds its way through the passages 59 of the disc 36 to the high pressure compartments of the intermediate chamber M to combine with the fluid displaced from the high pressure compartments of the intermediate and outer chambers. The outer chamber O receives its share of the displaced fluid through the passages 59' in disc 36' which communicate with the low pressure compartments of the intermediate chamber M. By rotating the valve structure 49 the valve ports 53 can be overlapped with the shaft channels 55 for the desired resistance to the fluid flow.

The setting of the valve structure 49 determines the resistance to fluid flow from the high pressure working compartments to the low pressure working compartments of the shock absorber when the piston structure is rotated in clockwise direction in response to rebound movement of the vehicle spring. For the compression movement of the vehicle spring less fluid resistance flow is required and means are therefore provided for affording an additional path for the fluid flow during such compression movement. Referring to Figures 1 and 4, each of the dam structures 40 and 40' in the intermediate chamber M are provided with a passageway 60 between the high pressure and low pressure chambers, the passage in the dam lug 40' connecting the high and low pressure chambers 46 and 47 while the passage through the dam lug 40 connects the high and low pressure chambers 46' and 47'. Each passage on the low pressure side is contracted to form a valve seat 61 for a check valve such as a ball 62 and in the passage in advance of the check valve there is a stop plug 63 having a circumferential channel forming an oil passage 64. During high pressure strokes of the shock absorber, that is, when the piston structure rotates clockwise in response to the vehicle spring rebound, the check valves 62 will seat and close the passages 60 so that all the flow is through the valve structure 49. During compression strokes of the shock absorber, that is, when the vehicle spring is compressed, the check valves 62 will be unseated for opening of the passages 62 for fluid flow passage in addition to that through the valve structure 49. If it is desired to increase or decrease the resistance to flow through the passages 60 retainer plugs 63 with less or greater depth passage channels are readily applied in the passage.

As the high and low pressure working compartments of the inner and outer chambers I and O have communication with those of the intermediate chamber M, the passages 60 through the dam members of the intermediate chamber will take care of the flow from all of the low pressure compartments to all of the high pressure compartments.

The working chambers receive replenishing fluid from the reservoir 13 through passages 65 in the plate 14 which passages communicate with the lower end of the high and low pressure compartments 46 and 47 of the inner chamber I, each passage being controlled by a check valve 66 to prevent reverse flow into the reservoir, the valving arrangement being clearly shown in Figures 1 and 6.

In the arrangement shown in Figure 1, the reservoir 13 is connected with the top of a circumferential intercepting channel 67 in the shaft 17 by a passage 68 through the bearing flange 15 so that any fluid leaking along the shaft will be intercepted and returned to the reservoir.

The outer corner of the flange 15 is beveled to form a recess for packing material 69 which is held in place by a retainer collar 70 surrounding the shaft and pressed against the packing by a spring 71 held in place by the spring retainer frame 72 which may be secured to the wall 11 by screws or by welding, a dust cap 73 seating over the outer end of the retainer frame.

In Figure 12 a modified arrangement is shown in which, instead of forming a bearing flange integral with the bottom of the housing cup 10, a bearing flange 74 is formed integral with the spring retainer part 75 and extends through an opening 76 in the bottom of the housing, the structure being secured in place as by welding.

All the parts of my improved shock absorber are of simple design and most of these parts can be readily and economically stamped from suitable metal with a minimum finishing requirement. In building up the piston structure of piston units formed of simple stampings welded together, and by providing separate chambers for the piston units by means of the stamped partition discs, a strong and durable shock absorber structure is produced adapted for heavy service. The various parts can be readily and quickly assembled accurately in the housing and will then be rigidly maintained in proper cooperative relation.

I have shown a practical and efficient embodiment of the various features of my invention but I do not desire to be limited to the exact structure, arrangement and operation shown and described as changes and modifications may be made without departing from the scope of the invention.

I claim as my invention:

1. In a hydraulic shock absorber of the rotary type, a cylindrical housing, stationary partitions dividing said housing axially into a plurality of hydraulic fluid chambers, a piston unit in each chamber, said piston units being separate members, and a shaft journaled in said housing and mounting said piston units.

2. In a hydraulic shock absorber of the rotary type, a cylindrical housing having end walls defining a cylindrical space, intermediate walls within said housing cooperating with said end walls to subdivide said space axially into a plurality of hydraulic chambers, a shaft extending through said space and journaled by said end walls, and a piston unit in each chamber secured to the shaft for rotational movement therewith.

3. In a hydraulic shock absorber, a peripheral wall and end walls therefor confining a cylindrical space, a shaft journaled in said end walls, partition discs parallel with said end walls and extending between the peripheral wall and shaft and cooperating with said end walls to subdivide said cylindrical space into a plurality of hydraulic chambers, a stationary dam wall in each chamber extending between the shaft and the peripheral wall, and a piston unit in each chamber secured to the shaft and extending to the peripheral wall.

4. In a hydraulic shock absorber, a housing comprising a peripheral wall and end walls defining a cylindrical space, a shaft journaled in said housing concentric with said peripheral wall, partition walls between and parallel with said end walls and extending between said shaft and said peripheral wall and subdividing said cylindrical space into a plurality of hydraulic chambers, stationary fluid abutments in each chamber, a piston structure in each chamber secured to rotate with the shaft, the piston and abutment structure in each chamber dividing said chamber into high pressure and low pressure hydraulic working compartments, passageways through said partition walls interconnecting all of the high pressure chambers and other passages through said partition walls interconnecting all of the low pressure compartments, valve mechanism controlling the fluid flow from the high pressure compartments to the low pressure compartments, and additional valve mechanism controlling the flow of fluid from the low pressure compartments to the high pressure compartments.

5. In a hydraulic shock absorber, a housing comprising a peripheral wall and end walls confining a cylindrical space, a shaft journaled in said end walls, intermediate walls cooperating with said end walls to divide said cylindrical space into a plurality of hydraulic chambers, a fluid abutment in each chamber, a piston in each chamber secured to the shaft to rotate therewith, said pistons and abutments dividing said chambers into high pressure and low pressure hydraulic working compartments, a valve chamber within said shaft, a set of passageways connecting all of the high pressure compartments with said valve chamber, a second set of passageways connecting all of said low pressure compartments with said valve chamber, and valve structure in said valve chamber controlling the flow of fluid between said sets of passageways.

6. In a hydraulic shock absorber, a housing comprising a peripheral wall and end walls defining a cylindrical space, a shaft journaled in said end walls concentric with said peripheral wall, intermediate walls cooperating with said end walls to divide said cylindrical space into a plurality of hydraulic chambers, fluid abutments in each chamber, a piston unit in each chamber comprising a hub receiving the shaft and vanes extending from the hub, said piston units and partition members dividing said chambers into high pressure and low pressure hydraulic working compartments, said shaft having a valve chamber therein, an annular collecting channel on said shaft and ports extending therefrom to said valve chamber, a set of passageways through said intermediate walls connecting all of the high pressure compartments with said collecting channel, a second collecting channel on said shaft having a port extending therefrom to said valve chamber, a second set of passageways through said intermediate walls connecting all of the low pressure compartments with said second channel, and valve mechanism in said valve chamber for controlling the fluid flow between the high pressure and low pressure compartments by way of said shaft ports.

7. In a hydraulic shock absorber, a peripheral wall and end walls defining a cylindrical space, a shaft journaled in said end walls, intermediate walls cooperating with said end walls to divide said cylindrical space into a plurality of hydraulic chambers, a stationary fluid abutment in each chamber, a piston unit in each chamber, said piston units being detachably keyed to the shaft, said abutment members being detachably keyed to said peripheral wall, and securing means carried by said abutment members for holding said intermediate walls against rotary displacement.

8. In a hydraulic shock absorber, a peripheral wall and end walls defining a cylindrical space, a shaft journalled in said end walls, intermediate walls cooperating with said end walls to define a plurality of hydraulic chambers, a fluid abutment in each chamber, a piston unit in each chamber keyed to said shaft to rotate therewith to displace the fluid in said chamber, means defining a path including passages through said intermediate walls for the flow of the displaced fluid, and valve mechanism for controlling the flow.

9. In a hydraulic shock absorber, a peripheral wall and end walls defining a cylindrical space, a shaft journaled in said end walls, two intermediate walls extending between said shaft and peripheral wall and cooperating with the end walls to divide said cylindrical space into three hydraulic chambers, said end walls and intermediate walls being stationary relative to said peripheral wall, fluid abutments in each chamber, a piston unit in each chamber having vanes operable between said abutments to displace the fluid, said shaft having a circumferentially extending channel in alignment with one of said intermediate walls and said intermediate wall having a passageway therethrough connecting the adjacent chambers and communicating with said shaft circumferential passage, a circumferential channel on said shaft in register with the other intermediate wall and said intermediate wall having a passageway therethrough connecting the adjacent chambers and communicating with said circumferential shaft passage, a valve chamber in said shaft and passages through the shaft connecting the valve chamber with the shaft circumferential channels, and valve mechanism interposed between the passages through the shaft.

10. In a hydraulic shock absorber, a cylindrical housing subdivided axially to provide a plurality of hydraulic chambers, a shaft journaled in said housing and surrounded by said chambers, a fluid abutment in each chamber and a piston unit in each chamber secured to the shaft to rotate therewith to displace fluid at opposite sides of the abutment, means interconnecting said chambers for the interflow of fluid, and valve mechanism for controlling the fluid flow.

11. In a hydraulic shock absorber, a cylindrical housing subdivided axially into a plurality of hydraulic fluid chambers, a shaft journaled in said housing, and separate piston structures for said chambers detachably secured to said shaft.

12. In a hydraulic shock absorber, a cylindrical housing subdivided axially into a plurality of sets of high and low hydraulic pressure chambers, a separate piston structure for each set of chambers, and a common driving element for said piston structures.

13. In a hydraulic shock absorber, a cylindrical housing subdivided axially into a plurality of sets of high and low pressure chambers, a separate piston element for each set of chambers, and a shaft extending axially in said housing and having detachable driving connection with said piston elements.

14. In a hydraulic shock absorber, a cylindrical housing subdivided axially into a plurality of sets of high and low hydraulic pressure chambers, a piston element for each set of chambers, a shaft extending axially in said housing and having driving connection with said piston elements, a valve chamber, a connection between said valve chamber and all of the high pressure chambers, a connection between said valve chamber and all of the low pressure chambers, and valve means between said connections for controlling the flow between the high pressure and low pressure chambers.

15. In a hydraulic shock absorber, a piston unit built up of plates engaging face-to-face and welded together, the fusion metal between the plates being provided by metal portions extruded from the plates.

16. In a hydraulic shock absorber, a piston unit built up of metal plates engaging face-to-face and secured together by fusion of metal between the plates, the fusion metal being provided by metal portions deflected from the plates.

RAY A. SANDBERG.